United States Patent
John et al.

(10) Patent No.: US 10,359,832 B2
(45) Date of Patent: Jul. 23, 2019

(54) METHOD AND APPARATUS FOR REDUCING POWER AND CYCLE REQUIREMENT FOR FFT OF ECG SIGNALS

(71) Applicants: Eugene Britto John, San Antonio, TX (US); Safwat Mostafa Noor, San Antonio, TX (US)

(72) Inventors: Eugene Britto John, San Antonio, TX (US); Safwat Mostafa Noor, San Antonio, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 350 days.

(21) Appl. No.: 15/465,695

(22) Filed: Mar. 22, 2017

(65) Prior Publication Data

US 2017/0277656 A1    Sep. 28, 2017

Related U.S. Application Data

(60) Provisional application No. 62/311,662, filed on Mar. 22, 2016.

(51) Int. Cl.
  G06F 17/14    (2006.01)
  G06F 1/3287   (2019.01)
  G06F 1/3296   (2019.01)

(52) U.S. Cl.
  CPC .......... G06F 1/3287 (2013.01); G06F 1/3296 (2013.01); G06F 17/142 (2013.01)

(58) Field of Classification Search
  CPC .............................................. G06F 17/14–142
  USPC .................................................. 708/403–405
  See application file for complete search history.

(56) References Cited

U.S. PATENT DOCUMENTS

2013/0245471 A1 *   9/2013   Baechler .............. A61B 5/0006
                                                                600/509

OTHER PUBLICATIONS

Perez-Pascual, A., Sanaloni, T., and Valls, J., "FPGA-based radix-4 butterflies for HIPERLAN/2", IEEE Int. Symp. on Circuits and Systems, p. 277, 2002 (Year: 2002).*
S. Mostafa, E. John, "Reducing power and cycle requirement for FFT of ECG signals through low level arithmetic optimizations for cardiac implantable devices", J. Low Power Electron., vol. 12, No. 1, pp. 21-29, 2016 (Year: 2016).*
"IEEE standard for floating-point arithmetic," pp. 1-70, Aug. 2008.
Abdul-Kadir et al., "Effect of ecg episodes on parameters extraction for paroxysmal atrial fibrillation classification," in Biomedical Engineering and Sciences (IECBES), 2014 IEEE Conference on, pp. 874-877, Dec. 2014.
Al-Fahoum et al., "Methods of eeg signal features extraction using linear analysis in frequency and time-frequency domains," ISRN neuroscience, vol. (2014).
Bergland, "A guided tour of the fast fourier transform," Spectrum, IEEE, vol. 6, No. 7, pp. 41-52, (1969).
Chandan et al., "Optimised FFT design using Constant Coefficient Multiplier," vol. 2, No. 6, pp. 2-7, (2012).

(Continued)

*Primary Examiner* — Matthew D Sandifer
(74) *Attorney, Agent, or Firm* — Norton Rose Fulbright US LLP

(57) ABSTRACT

Embodiments of the invention described herein provides devices and methods that exploit the repetitive nature of the Electrocardiogram (ECG) to reduce the number of total arithmetic operations required to execute a 128 point FFT routine.

20 Claims, 8 Drawing Sheets

(56) References Cited

OTHER PUBLICATIONS

Chang et al., "On the Fixed-Point Accuracy Analysis of FFT Algorithms," IEEE Transactions on Signal Processing, vol. 56, pp. 4673-4682, (2008).
Embedded. Artists, "Lpe11u35 quickstart board user manual," Available at: http://www.embeddedartists.com/products/boards/, Jun. 2012.
Fraser, "Algorithm 545: An optimized mass storage fft [c6]," ACM Trans. Math. Softw., vol. 5, pp. 500-517, Dec. 1979.
Goldberger et al.,"PhysioBank, PhysioToolkit, and PhysioNet: Components of a new research resource for complex physiologic signals," Circulation, vol. 101, No. 23, pp. e215-e220, (2000).
Jeon et al., "24.3 an implantable 64nw ecg-monitoring mixed-signal soc for arrythmia diagnosis," in Solid-State Circuits Conference Digest of Technical Papers (ISSCC), 2014 IEEE International, pp. 416-417, IEEE (2014).
Jiang et al., "Multiplierless fast Fourier transform architecture," Electronics Letters, vol. 43, pp. 191-192, (2007).
Karner et al., "Multiply-add optimized fft kernels," Mathematical Models and Methods in Applied Sciences, vol. 11, No. 01, pp. 105-117, (2001).
Renumadhavi et al., "A new approach for evaluating snr of ecg signals and its implementation," in Proceedings of the 6th WSEAS International Conference on Simulation, Modelling and Optimization, SMO'06, (Stevens Point, Wisconsin, USA), pp. 202-205, World Scientific and Engineering Academy and Society (WSEAS), (2006).
Sorensen et al., "Real-valued fast fourier transform algorithms," Acoustics, Speech and Signal Processing, IEEE Transactions on, vol. 35, No. 6, pp. 849-863, (1987).
Sorensen et al., "On computing the split-radix fft," Acoustics, Speech and Signal Processing, IEEE Transactions on, vol. 34, No. 1, pp. 152-156, (1986).
Sridhara, "Ultra-low power microcontrollers for portable, wearable, and implantable medical electronics," in Proceedings of the 16th Asia and South Pacific Design Automation Conference, pp. 556-560, IEEE Press, (2011).
Vaneghi et al., "A comparative approach to ecg feature extraction methods," in Intelligent Systems, Modelling and Simulation (ISMS), 2012 Third International Conference on, pp. 252-256, Feb. 2012.
Widrow, "Statistical analysis of amplitude-quantized sampled-data systems," Transactions of the American Institute of Electrical Engineers, Part II: Applications and Industry, vol. 79, pp. 555-568, (1961).

\* cited by examiner

METHOD AND APPARATUS FOR REDUCING POWER AND CYCLE REQUIREMENT FOR FFT OF ECG SIGNALS

PRIORITY PARAGRAPH

This application claims priority to U.S. Application No. 62/311,662 filed Mar. 22, 2016, which is incorporated herein by reference in its entirety.

STATEMENT REGARDING FEDERALLY FUNDED RESEARCH

This invention was made with government support under 1SC3GM096937-01A1 awarded by the National Institutes of Health. The government has certain rights in the invention.

SUMMARY

The Fast Fourier Transform or FFT remains to be the de facto standard in almost all disciplines for computing discrete Fourier transform. In embedded biomedical applications, efficient signal processing algorithms such as FFT for spectrum analysis are indispensable. The FFT is an O(N $\log_2$N) algorithm which requires complex multiplication and addition using floating point numbers. On extremely power constrained embedded systems such as cardiac pacemakers, floating point operations are very cycle intensive and costly in terms of power. Embodiments of the invention described herein provides devices and methods that exploit the repetitive nature of the Electrocardiogram (ECG) to reduce the number of total arithmetic operations required to execute a 128 point FFT routine. Using the concept of lookup tables, the proposed method is able to improve both the performance and energy footprint for computing the FFT of the ECG data. In certain aspects, an increase of 9.22% in computational speed and an improvement of 10.1% in battery life on a 32 bit embedded platform for a standard split-radix-2 FFT routine can be achieved.

Certain embodiments are directed to an apparatus, comprising: a controller configured to transform received data into a frequency domain through a Fast Fourier Transform (FFT), wherein the controller is configured to compute the Fast Fourier Transform of the received data by performing certain arithmetic steps. One of the primary steps is floating point multiplication which comprises of: receiving a first operand of the received data for a multiplication operation; receiving a second operand of the received data for the multiplication operation; determining which of a predetermined set of values corresponds with the first operand; and calculating a result of the multiplication operation based, at least in part, by accessing a lookup table loaded with precomputed multiplication results, wherein the precomputed multiplication results correspond to the predetermined set of values. In certain aspects of the step of determining which of the predetermined set of values comprises examining only a subset of bits representing the first operand. In a further aspect, the first operand is represented as an IEEE-754 single precision format value, and wherein the step of examining only the subset of bits comprises examining a third byte of the total 32 bits. The predetermined set can comprise at least zero and one. In certain aspects, the step of calculating the result comprises: returning a zero when the first operand comprises zero; returning the second operand when the first operand comprises one; returning a value from the lookup table when the first operand comprises at least one other value of the predetermined set of values; and performing the multiplication operation in the controller when an entry from the lookup table does not match the first operand and the second operand. In a further aspect, the step of returning the value from the lookup table comprises calculating an index of the lookup table comprising the steps of: extracting an exponent value of a float input; and using the extracted exponent value to shift a mantissa by an appropriate amount to the right to find an integer value of the float input. In certain aspects, the controller is a microcontroller, and wherein the apparatus is a low-power biomedical embedded solution. The apparatus can further comprise an analog-to-digital converter (ADC), and wherein the microcontroller is configured to receive at least one of the first operand and the second operand from the ADC. In certain aspects, the apparatus can further comprising a pacemaker, wherein the pacemaker is coupled to the ADC and configured to provide echocardiogram (ECG) data to the ADC. In a further aspect the microcontroller is further configured to generate a frequency spectrum of the ECG data.

Certain embodiments are directed to a method, comprising: transforming received data into a frequency domain through a Fast Fourier Transform (FFT), wherein the step of transforming comprises floating point multiplication operation steps comprising: receiving a first operand of the received data for a multiplication operation; receiving a second operand of the received data for the multiplication operation; determining which of a predetermined set of values corresponds with the first operand; and calculating a result of the multiplication operation by accessing a lookup table loaded with precomputed multiplication results, wherein the precomputed multiplication results correspond to the predetermined set of values. In certain aspects, the step of determining which of the predetermined set of values comprises examining only a subset of bits representing the first operand. In a further aspect, the predetermined set comprises at least zero and one. In still a further aspect, the step of calculating the result comprises: returning a zero when the first operand comprises zero; returning the second operand when the first operand comprises one; returning a value from the lookup table when the first operand comprises at least one other value of the predetermined set of values; and performing the multiplication operation in the controller when an entry from the lookup table does not match the first operand and the second operand. In certain aspects, the step of returning the value from the lookup table comprises calculating an index of the lookup table comprising the steps of: extracting an exponent value of a float input; and using the extracted exponent value to shift a mantissa by an appropriate amount to the right to find an integer value of the float input. In a further aspect, the received data comprises echocardiogram (ECG) data received from a pacemaker, and wherein the step of transforming the received data comprises generating a frequency spectrum of the ECG data.

Certain embodiments are directed to a computer program product, comprising: a non-transitory computer readable medium comprising code to perform the step of transforming received data into a frequency domain through a Fast Fourier Transform (FFT), wherein the code to perform the transforming step comprises code to perform steps comprising: receiving a first operand of the received data for a multiplication operation; receiving a second operand of the received data for the multiplication operation; determining which of a predetermined set of values corresponds with the first operand; and calculating a result of the multiplication operation by accessing a lookup table loaded with precomputed multiplication results, wherein the precomputed multiplication results correspond to the predetermined set of values. In certain aspects, the predetermined set comprises at least zero and one. In a further aspect, the step of calculating the result comprises: returning a zero when the first operand comprises zero; returning the second operand when the first operand comprises one; returning a value from the lookup table when the first operand comprises at least one other value of the predetermined set of values; and performing the multiplication operation in the controller when an entry from the lookup table does not match the first operand and the second operand. In a further aspect, the step of returning the value from the lookup table comprises calculating an index of the lookup table comprising the steps of: extracting an exponent value of a float input; and using the extracted exponent value to shift a mantissa by an appropriate amount to the right to find an integer value of the float input.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

One of the most important mathematical concepts on which signal processing has evolved is the Fourier Transform. Introduced in 1822 by French mathematician Joseph Fourier, the Fourier transform continues to find innovative applications in various domains. The use of Fourier transform became even more widespread with the emergence of digital signal processing. At present, the Discrete Fourier Transform (DFT) is one of the most impactful signal processing algorithms which is being utilized in nearly every field of science and engineering. DFT allows the conversion of a discrete time domain signal to its frequency domain components and enables the measurement of its frequency spectrum. This insight holds profound importance in biomedical signal processing [1], especially for extracting the features of biological signals such as Electrocardiogram (ECG) [2-4] and Electroencephalogram (EEG) [5] to better understand their properties.

A prime example of digital signal processing at work can be found inside a cardiac pacemaker. These implantable devices continuously monitor ECG data for detecting any abnormality in the electric pacing signals naturally generated by the hearts conduction system. Fourier Transform has long been a key part of the signal processing and filtering employed in cardiac pacemakers [6]. Given the battery powered and extremely energy constrained operating conditions, any optimization in the DFT computation is always desired. Due to the popularity of Fourier transform, there have been attempts [6-8] from many different perspectives to improve its performance. Embodiments described herein are directed to methods and devices for improving the computation efficiency of the DFT for ECG signals. By exploiting specific properties and patterns associated with regular ECG data, a low level arithmetic operation technique is described which reduces the computation time as well as the energy requirement for the multiplication step used to compute DFT in cardiac pacemakers.

Figure 1:
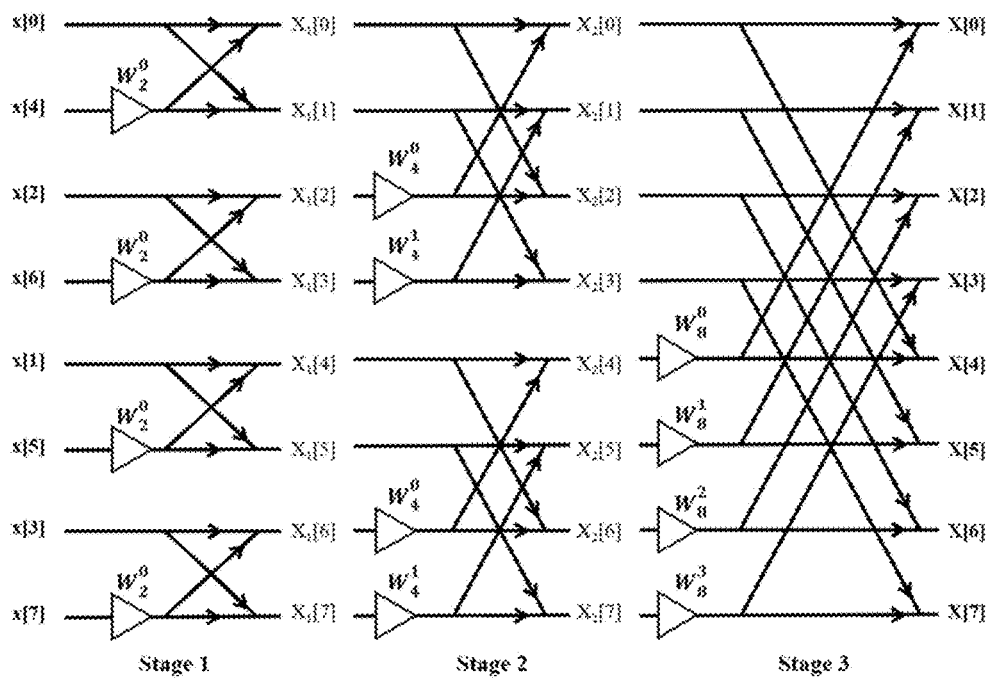
FIG. 1. The butterfly diagram for computing an 8 point FFT. A total of three stages are required with four distinct twiddle factors $W_2^0$, $W_4^1$, $W_8^2$ and $W_8^3$. $X_1[n]$ and $X_2[n]$ indicate intermediate DFT results.

DFT computation—The discrete Fourier Transform is usually considered to be a moderately demanding algorithm, requiring a large number of complex variable arithmetic. The DFT of a discrete time domain signal x[n] is given by Equation (1).

$$X[k] = \sum_{n=0}^{N-1} x_n \cdot e^{\frac{-2\pi i k n}{N}}, k \in Z \qquad (1)$$

where $x_n$ represents the nth input data samples, X stands for the DFT of the input sequence x and N is the total number of samples. The input data points, denoted by $x_n$ are usually complex variables with a real and an imaginary part. The exponential term involved in the DFT equation is called the Twiddle Factor (often denoted as $W_N^n$) and can be expressed as $\cos(2\pi kn/N) - \sin(2\pi kn/N)$ using Euler's formula. By analyzing Equation (1), it can be understood that a signal with N samples will require $N^2$ complex arithmetic operations, given that the DFT is calculated in a straightforward manner. For this reason, the original DFT algorithm is said to have $O(N^2)$ complexity and is generally not desirable. Efficient and faster algorithms such as the Fast Fourier Transform (FFT) is typically preferred since it has a complexity of only $O(N \log_2 N)$ [9]. To achieve this performance, the FFT algorithm recursively decimates the original input sequence into odd and even sub-sequences, computes the DFT of the smallest subsequence and finally combines the results in $\log_2 N$ stages. From an algorithms perspective, this approach is somewhat similar to the Divide and Conquer technique used by numerous existing programs [10]. FIG. 1 shows the flow of calculation, twiddle factors and the total number of stages needed for computing an 8 point FFT.

In many scenarios, the input sequence to the FFT is real valued. Fortunately, efficient methods to compute the DFT of real valued inputs using the unmodified complex FFT subroutine exists [11]. These algorithms add some pre and post processing steps to the original FFT algorithm to comply with the real valued input and output. In the case of ECG data, the input samples are real valued and require these pre and post processing steps in addition to the primary FFT subroutine. However, these extra steps do not involve demanding arithmetic operations and unlike the FFT routine, their computational complexity does not exhibit a quadratic growth with sample size [12]. The following discusses the method of computing the FFT of real data.

FFT of real values—The DFT of a 2N-point real sequence can be calculated using an N point complex FFT, using a split radix FFT algorithm. Given a real valued sequence g(n) of length 2N, two separate sequences $x_1(n)$ and $x_2(n)$ needs to be created as given below:

$x_1(n) = g(2n)$ $x_2(n) = g(2n+1)$ where, $0 \leq n \leq N-1$

In the next step, the two sequences $x_1(n)$ and $x_2(n)$ must be re-arranged to represent a new sequence x(n) given by:

$x(n) = x_1(n) + i x_2(n) \qquad (2)$

If the array representation of x(n) is such that real and imaginary parts occupy the even and odd locations respectively, then no special pre-processing is required on the original sequence g(n). Other forms of representation may need some data re-arrangement to achieve the creation of x(n) from g(n). Assuming that the DFT of x(n) is given by X(k), the DFT of g(n) can be computed using Equation (3)

$G(k) = X(k)A(k) + X^*(N-k)B(k) \qquad (3)$

Here, A(k) and B(k) are called Split Coefficients that are required to split the interleaved complex result to the desired real valued form. A(k) and B(k) are defined as:

$$A(k) = \frac{1}{2}\left(1 - ie^{-\frac{\pi i k n}{N}}\right) \qquad (4)$$

$$B(k) = \frac{1}{2}\left(1 + ie^{-\frac{\pi i k n}{N}}\right) \qquad (5)$$

As it is evident from the discussion above, the FFT of a 2N length real valued sequence requires two primary steps, an FFT of length N and post-processing of the result using split Equation (3). In most practical applications, both the Twiddle Factors and Split Coefficients are precomputed and stored in memory [13] to increase the overall speed. The FFT operation on x(n) is the most computationally demanding part of the entire DFT calculation [11]. The devices and methods described herein improves upon the performance of the original FFT algorithm by exploiting specific characteristics of ECG signals and the simplicity of the initial twiddle factors. In the following section, such properties of ECG signals are highlighted and discussed.

Figure 2:
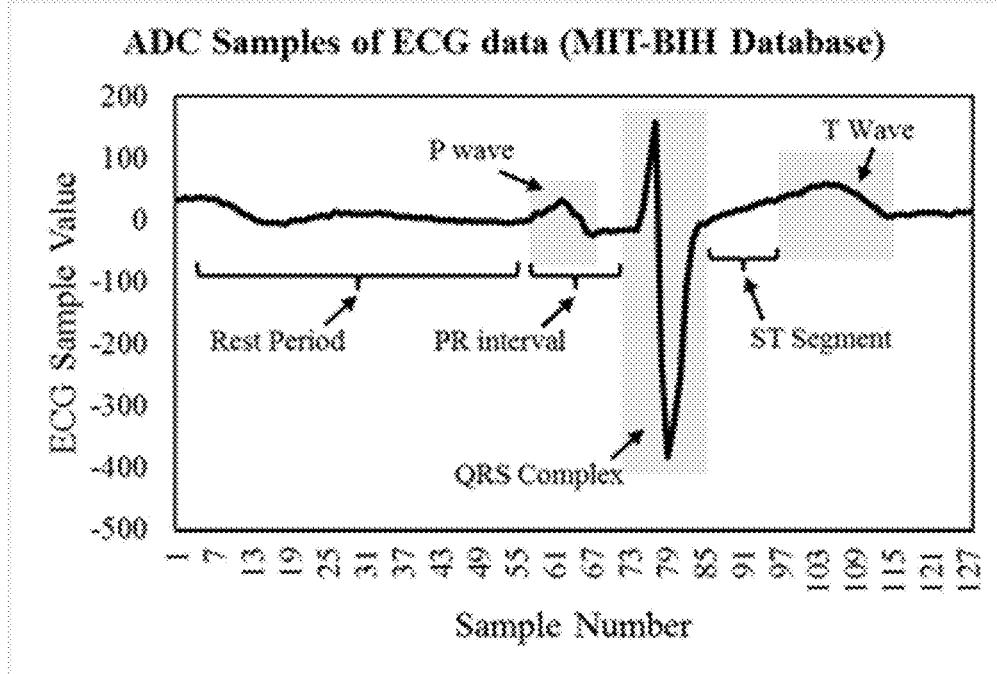
FIG. 2. A plot of digital ECG samples collected from MIT-BIH Long Term ECG Database. The markers indicate various segments of an ECG signal [17]. Excluding the QRS Complex, the range of the signal is limited within 0-60.

Properties of the ECG—The normal function of a heart involves periodic pacing which is generated by contraction and expansion of certain muscles in the heart. The regular actuation is governed by electric impulses conducted and distributed by special conduction fibers [14]. An Electrocardiogram is a record of these electric impulses captured using sensing electrodes. In modern systems, the ECG readings are sampled and each sample is converted to binary number by an analog to digital converter. The range of the binary number depends on the number of bits utilized in the ADC, also known as sample quantization levels. Determining the appropriate quantization levels of a signal depends on the Signal to Noise Ratio (SNR) and the desired accuracy of the process [15]. The SNR of an unfiltered ECG signal is relatively low [16] with existing ECG records suggesting a quantization level of 10 bits suffice most operating conditions. FIG. 2 shows a recorded 10-bit digital ECG signal plotted against time. The data is nearly periodic and exhibits the well-known P wave, PR interval, QRS complex, S segment, T waves and the rest period [17]. Statistical analysis shows that most of the data samples within a complete ECG cycle have a low range (0-60) and a low standard deviation (18.3), except for the data points in the QRS region. Therefore, a set of randomly selected samples outside the QRS complex holds a high probability of having the same binary value. This holds true for all cycles of the ECG signal under normal conditions. Due to these repeated values, when an input sequence similar to FIG. 2 is processed through an FFT algorithm, a large of number of redundant arithmetic operations takes place within each FFT stage. Based on this predictable phenomenon, the FFT routine can be optimized by storing and reusing the multiplication results of the common numbers at multiple stages of the overall FFT computation. The samples present in the S and T segments take up only a small number of distinct values, implying that the amount of memory required to store the frequently occurring multiplication results does not need to be large. Therefore, at the cost of small amounts of additional look up memory, the FFT computation of a normal ECG signal can be significantly optimized. Implantable cardiac devices are expected to benefit largely in performance and battery life from such application specific optimization. The existence of an FFT routine specifically optimized for ECG opens up the possibility of replacing dedicated FFT computing circuitry with general purpose processors (GPP). Advancements toward efficient computing on GPP platforms eliminates the development cost and time for designing ASIC components and increases overall flexibility.

Figure 3:
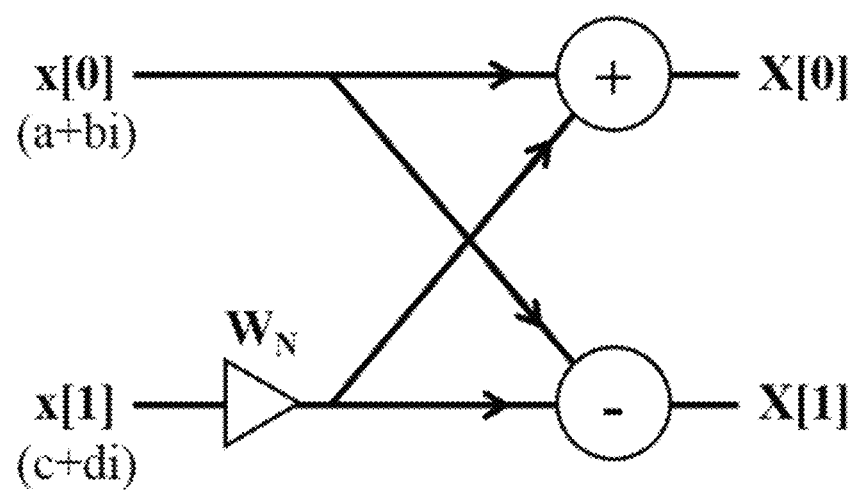
FIG. 3. A butter structure used in FFT computation. At a lower level, each butterfly consists of four floating point multiplications and six additions.
Figure 4:
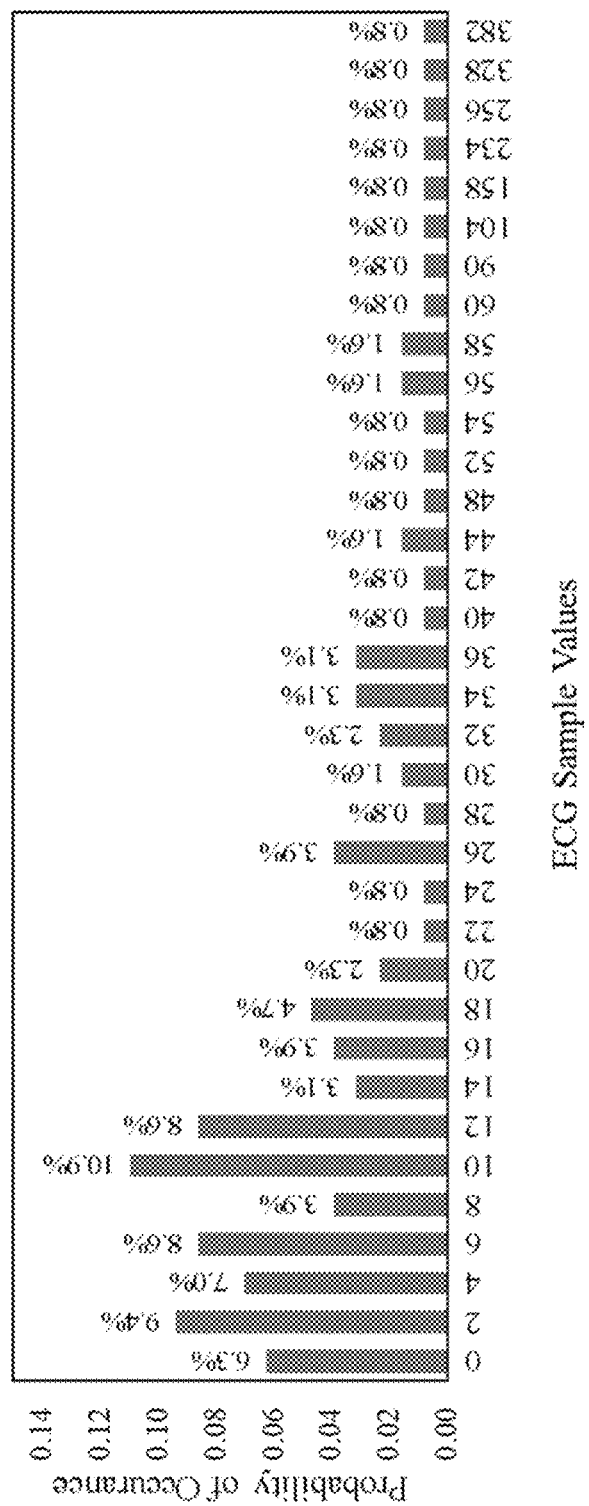
FIG. 4. Probability distribution of the FFT input data samples. Due to the low range and variance of ECG data, samples with lower magnitude exhibit significantly high probability of multiple occurrence.

FFT of ECG signals—After the ECG data stream is sampled by the ADC, it is temporarily stored as a sequence of fixed point integer numbers. These 10-bit integer needs to be represented in a standard numbering format before it can be processed by an FFT routine. Fixed point number representation requires intermediate scaling to ensure precision but often fails to deal with the dynamic range required in Fourier transform [20]. Floating point representation works best in sustaining both precision and dynamic range through the FFT stages at the cost of arithmetic complexity. All the optimization techniques described here deals with IEEE-754 floating point representation and related arithmetic. For an N point FFT, each stage consists of N/2 butterfly structures. As shown in FIG. 3, each butterfly performs one complex multiplication and two complex additions. Since both the real and imaginary parts of the complex numbers (a+bi) are floating point numbers, each butterfly actually performs four floating point multiplications and four additions. Due to the nature of the ECG data, the real value a or b tends to reappear in both multiplication and addition steps of a butterfly. In every butterfly, the multiplication occurs between the twiddle factor (Operand 1) and one of the complex inputs (Operand 2). By plotting the distribution of the second operand of the multiplier for the first FFT stage as shown in FIG. 4, it is possible to identify the most common numbers and the frequency of their occurrence.

From a deeper analysis of twiddle factors, it can be observed that the values of $W_N^n$ are relatively simple for the first three stages. Only four distinct twiddle factors are required for the first three stages and they are given below:

$$W_2^0=1$$

$$W_4^1=-i$$

$$W_8^2=0.707-0.707i, W_8^3=-0.707-0.707i$$

Figure 5:
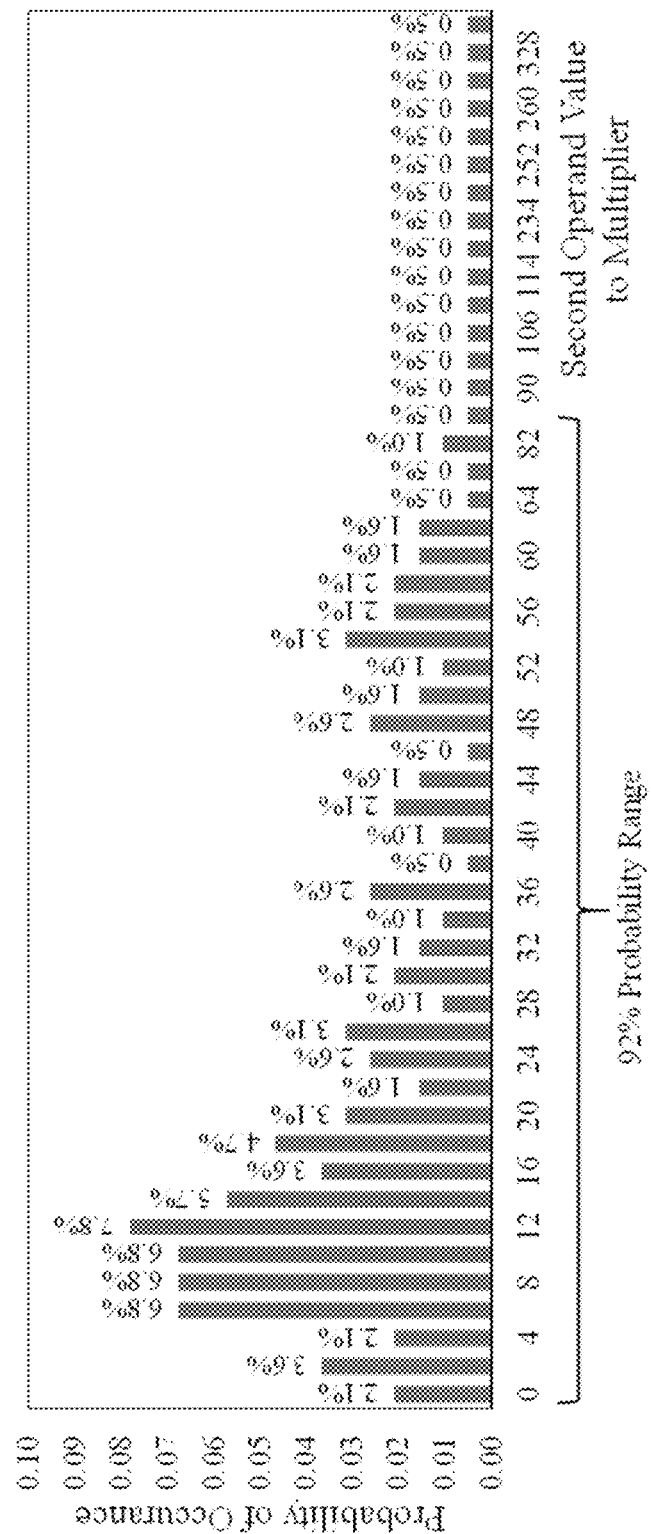
FIG. 5. Combined probability distribution of second operand at the multiplication routine of the first three stages. 92% of the probability fall within the input range 0 to 82.

Due to the fixed and relatively simple twiddle factors, the results of the first two stages remain fraction-less. Therefore, the multipliers of the first three stages continues to experience repeated values at its second operand with significantly high probability. The combined Operand 2 distribution for the first three stages is shown in FIG. 5. From the distribution, it can be observed that to cover 92% of all possible multiplication inputs of the first three stages, only a small input value range of 0 to 82 needs to be considered. Therefore, by using a small lookup table loaded with pre-computed multiplication results, the first three stages (at least) can be made more efficient. Two specific techniques are used to exploit these observations which improves the speed and power efficiency of the FFT operation of the ECG signals. The first technique involves using a small array to store and reuse precomputed multiplication results for common input numbers and twiddle factors. The second technique creates an optimized multiplication routine for multiplying known simple twiddle factor variables (0 or 1) with any input number, regardless of their presence in the look-up array.

Prior work in the area of FFT optimization explored the use of distributed arithmetic (DA) [18] and constant co-efficient multiplication techniques [19] to reduce the cycle and power requirement of arithmetic involved in the FFT computation. Although the concepts of intermediate result lookup hold similarity with the methods described herein, the area of application and specific implementation techniques differ significantly. The novelty of the approach presented resides in the statistical insight of ECG signals, allowing specific cycle and power reduction methods to be applied.

FFT computation method—In the proposed FFT computation method, two stage specific multiplication subroutines are utilized. The first three stages of the FFT computation method are configured to use an optimized floating point multiplication routine as the multiplications are more likely to be performed between known twiddle factors and repeated sample values. The remaining stages of the FFT use a standard floating point multiplication routine. Looking at the absolute values of the real and imaginary part of the twiddle factors in the first three stages, it is evident that only three specific values are present. These are 0, 1 and 0.707. Therefore, the multiplication routine only needs to detect three floating point inputs at its first operand and calculate the absolute result. Fractional multiplication results only occur after the third stage of the FFT, allowing the optimized multiplication routine to consider floating point number with integer values in the range of 0-82 for most of its second operand. By identifying the range of possible numbers, a set of bitwise operations are developed to efficiently calculate the index needed to fetch the multiplication result from the lookup table (LUT).

Optimized floating point multiplication routine—Based on the possible multiplication operations that will take place in the first three stages, the optimized subroutine, the size of the lookup table and its content can be designed. The optimized subroutine relies on the bit level arrangements of IEEE-754 single precision floating point format [21] to identify the operands and generate the corresponding result. The process starts with first calculating the absolute value of the result, followed by setting the appropriate sign. Calculating the absolute value of the result is straight forward through bitwise operations when the first operand is either 0 or 1, making it possible to generate the result without performing any look-up. An access to the look-up table is only needed for cases when the first operand has an absolute value of 0.707. In this scenario, the second operand holds a value within 0 to 82 as per the presented statistics. To store the multiplication result of these input cases, the look-up table needs a minimum size of 82 words or 328 Bytes. The index for the look-up table is generated by extracting the absolute integer value of the second operand from its floating-point format. The arrangement of the sign bit, exponent and mantissa in the IEEE-754 single precision format is presented in FIG. 6 and can be referred to understand the bit level operations in the multiplication subroutine.

Figure 6:
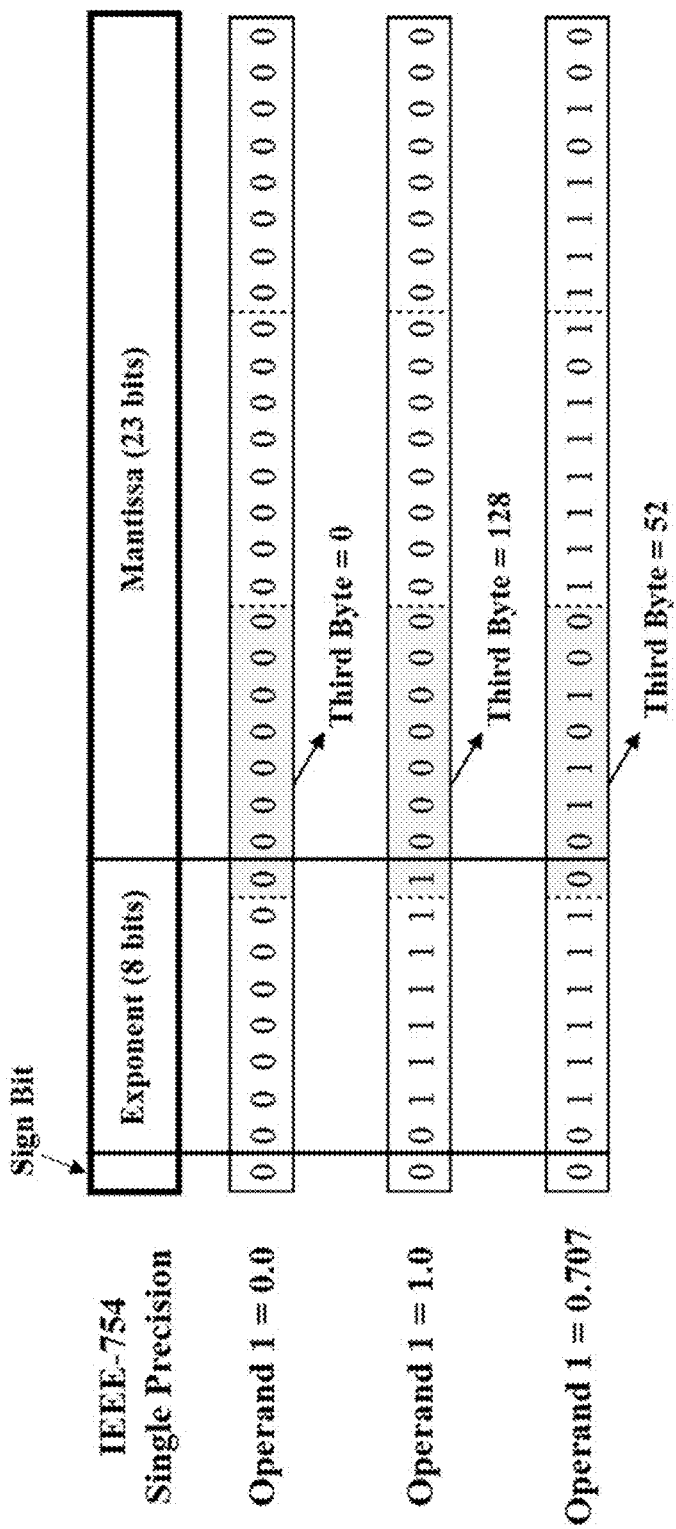
FIG. 6. The IEEE-754 floating point format. There is 1 bit for the sign, 8 bits for the exponent and 23 bits for the mantissa. The three possible cases for the word sized Operand 1 have three distinct values at the third byte.
Figure 7:
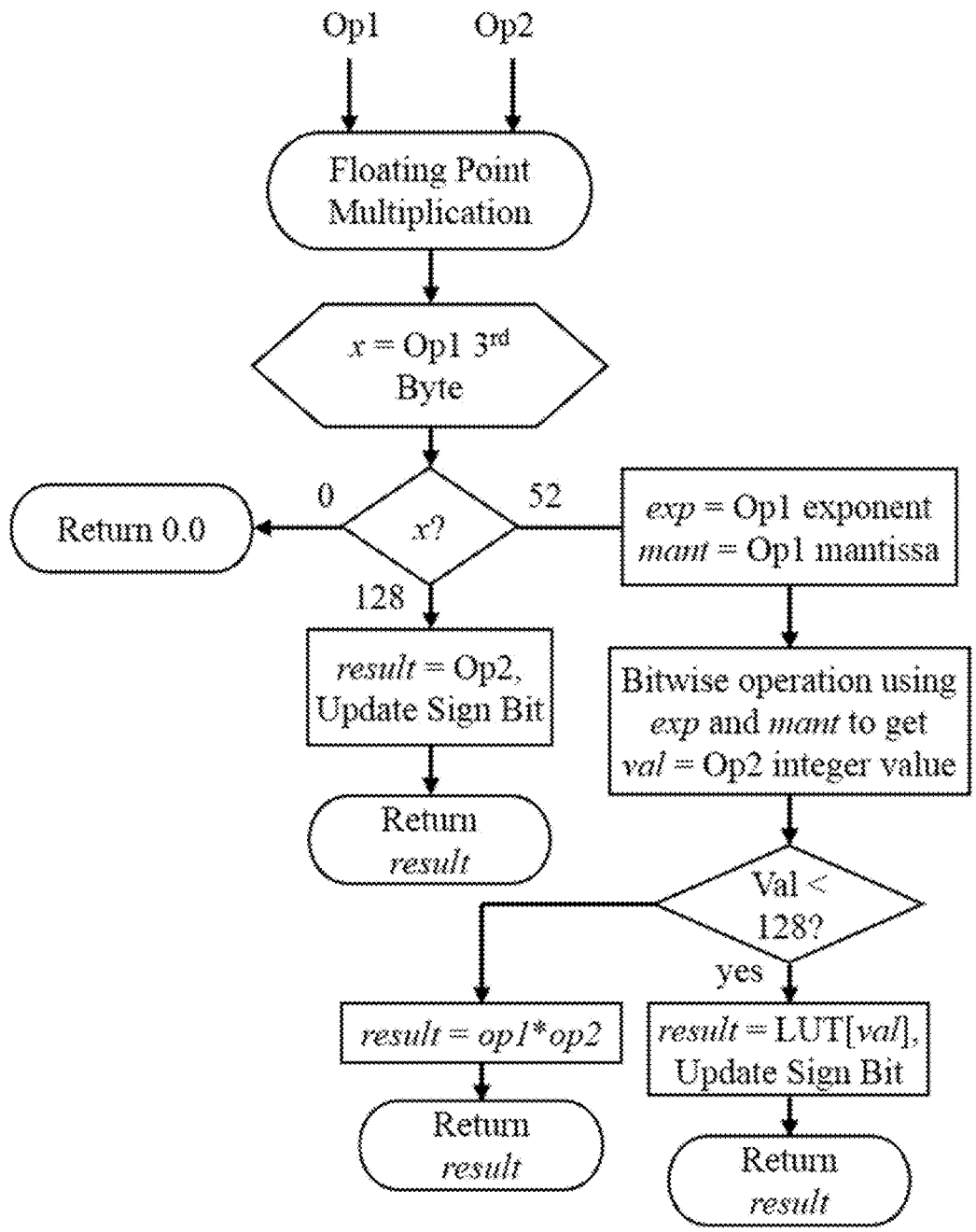
FIG. 7. Logical flow diagram for the optimized floating point multiplication routine.
Figures 8, 9:
FIG. 8. Lookup table for cases when Op1=0.707 and Op2 is within 0 to 82.
FIG. 9. Comparison of the cycle requirements for an unmodified and optimized FP multiplication routine.

The flow of the new multiplication routine is shown in FIG. 7. The first step involves checking for the three possible input conditions for the first operand. In single precision floating point numbers (32 bits), the third byte consists of one bit from the exponent and seven bits from the mantissa. A byte pointer is used to check the value of the third byte in the word sized floating point operand. The third byte holds three distinct values 0, 128 and 52 respectively for input 0, 1 and 0.707, as shown in FIG. 6. Although this operand identification can be performed by looking at only two bits of the entire word (bit 24 and 22), accessing a byte was chosen for the sake of minimum execution cycle and code size. On most, if not all general-purpose processors, byte aligned access is more cycle efficient than bit level access and generally requires a single instruction whereas bit level access requires one or more shift/logical operations. When the input is found to be 0 or 1, a value equal to zero or the second operand is returned respectively as the result. Among these two cases, the sign of the output needs to be modified for the later. The sign modification is a simple XOR operation between the leading bit of the two operands. The remaining input case is 0.707 for which the look-up table is populated. As depicted in FIG. 8, the look-up table is basically an array of length 82, populated with precomputed absolute results. Calculating the index of the look-up array involves two arithmetic steps. The first step extracts the exponent of the float input. This is done by right shifting the word by 23 places and subtracting 127 from it as per the IEEE-754 specification. The next step uses the exponent value to shift the mantissa by the appropriate amount to the right to find the integer value of the float. An implicit 1 needs to be appended to the mantissa to comply with the floating point format before the shift operations. The exact C statements used to generate the index from the input are listed in the following code snippet:

exponent=((unsigned char)((op2)>>23)−127);

LUT_index=((unsigned char)((op2|(1<<23))>>(31−exponent));

After a result is looked up from the table, the sign of the variable is modified by XOR-ing the leading bits of the inputs. To ensure execution cycle efficiency, the entire routine was designed with a focus toward keeping conditional statements and memory access to a minimum as these require more clock cycles to be executed on most processor architectures. The arithmetics were limited to bitwise operations and fixed point additions as these are typically the fastest instructions to execute.

Testing Procedure—To experimentally verify the newly developed subroutine, an ARM Cortex M0 development board designed by Embedded Artists [22] was selected. The chip manufactured by NXP holds the part number LPC11U35. These efficient 32 bit microcontrollers (MCU) are increasingly being adopted for the next generation low power biomedical embedded solutions [23] [24]. The Cortex M0 does not include a floating-point unit and is able to perform bitwise operations and integer additions in a single cycle [25], making it a prime candidate for benchmarking the proposed optimization techniques. The development board contains no additional components, allowing for accurate measurement of power.

To quantitatively analyze and validate the proposed optimization techniques, an unmodified FP multiplication routine was compared with the optimized version. The cycles required for different input conditions were captured using an inbuilt general purpose counter. An unmodified FFT routine and the optimized FFT routine was also loaded to the memory and tested in turns to compare the cycle requirements. The data used for the FFT tests were collected from MIT-BIH Long Term ECG database, available publicly at PhysioNET [26]. The data is sampled at 200 Hz using 10-bit ADC. An FFT length of 128 point was calculated during the test since a complete heart beat cycle takes about 120 samples to be represented in the test data set. All tests were performed at a speed of 12 MHz, clocked by the low power internal oscillator of the MCU. Finally, the power was measured by monitoring the active current consumption and program execution time.

Results and analysis—The cycle reduction for floating point multiplications was compared for four specific input conditions. The first case is for an input of value 0, followed by the second case for an input of value 1 and the last two cases are for an input value of 0.707 paired with a second operand available in the lookup table and one which is not. Each case is compared with a straightforward floating point multiplication. The captured execution cycle results are shown in FIG. 9.

Performance improvements for FP multiplication—The reduction in the number of cycles required for the FP multiplication is clearly noticeable for three out of the four input condition presented in FIG. 9. From FIG. 9 it can be inferred that on an average 54.98% computation cycle is saved through the proposed optimization. An overhead of 12.5% is introduced in the fourth case when the second operand is not available in the lookup table and an actual calculation needs to be performed. However, it is important to note that such scenarios only occur in the third stage which has a low probability of occurrence. The total accumulated cycle savings largely surpasses the overhead introduced in this case. A comparison of the performance of the optimized multiplier with published results dealing with similar design techniques is presented in Table I. Amongst the comparison, this work proves to be a scalable and efficient method resulting in significant cycle reduction. To test the energy footprint of the multiplication routines, the four possible test cases are executed on the ARM Cortex MCU. The current consumption is measured and the average energy considering all four cases was found to be 18.7 nJ, whereas the non-optimized multiplication routine consumed 29.8 nJ. The proposed optimization exhibited a reduction of approximately 37%.

TABLE I

Comparison of published results dealing with optimized multiplication in FFT computation

| Parameter | Jiang, M et al | Chandan, M et al | This Work |
|---|---|---|---|
| Algorithm | Distributed Arithmetic | Constant Co-efficient Multiplication | Custom LUT |
| Number Format | 16 bit Integer | 16 bit Integer | 32 bit Floating Point |
| Improvement Achieved | Area, Power | Speed, Power | Speed, Power |
| Memory Requirement | 64 Words | NA | 82 Words |
| Scalability | Exponential LUT size increase | Scalable | Scalable |
| Implementation | FPGA, Custom | FPGA, Custom | MCU, General Purpose |
| Cycle Reduction | N/A | 31.73% | 54.98% |

Figure 10:
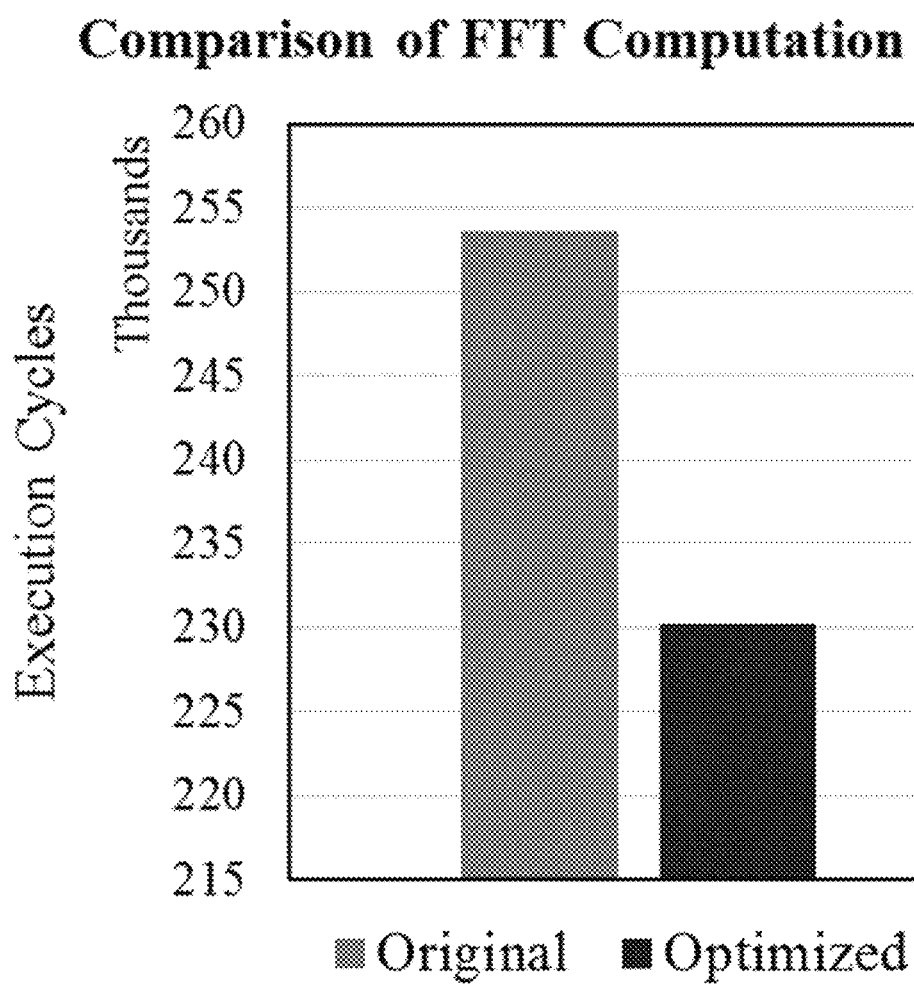
FIG. 10. Comparison of the cycle requirements for an unmodified FFT routine and a modified version utilizing optimized multiplication.

FFT operation speedup—FIG. 10 shows the comparison results of running a 128 point FFT. The average cycles required for a series of 10 FFT operations using a 1280 sample was 253 thousand and 230 thousand respectively for an unmodified and a modified routine. On an average 9.22% reduction in required cycles was observed. This result takes into account all 7 stages of the FFT including the occasional overhead highlighted in the previous section. For a larger FFT input set, the application of this method is expected to generate a larger number of look-up table access and an increase in the number of multiplications that are optimized. Although processing more than one ECG cycle contained in 128 sample at any given time is unlikely, a longer input stream of 256 sample is tested to analyze the scalability of the algorithm. When sample size is increased from 128 to 256, the number of optimized multiplication increases by 100.31%. Even in such an improbable condition, the efficiency of the algorithm reduces by only 7.1% due to the additional FFT stage introduced in the computation.

Reduction of energy requirements—Given the faster computation time for a 128 point FFT, the proposed FFT routine is also expected to reduce the energy footprint. The amount energy consumption depends on the active current and the duration of the target workload execution. Spending a shorter time in the active/execution state is important in achieving a low average power consumption which in turn will result in extended battery runtime. When operating at 1.8V and clocked by the internal low power 12 MHz oscillator, the total energy consumed for the original FFT routine was found to be 62.2 µJ whereas the optimized version consumed only 56.4 µJ. In the long-term usage, the reduced energy consumption will improve FFT computation runtime by multiple months on a typical pacemaker's battery with a capacity of 1.2 Ah at 2.7V [27]. Considering a typical beat to beat interval of 0.75 seconds [17], the 9.32% energy saving translates to approximately 5.5 months or 0.4 years (10.1%) more of available computation time.

Efficient processing of biological data such as ECG becomes a challenging task in computationally constrained environments. Ensuring algorithmic efficiency and reducing power consumption often requires application specific optimizations of the computation routine or the hardware itself. Although circuit level optimizations provide greater flexibility and better results, the modification of the computation method is almost always a faster and affordable alternative. Embodiments described herein take advantage of the inherent spatial properties of ECG signals to efficiently generate the frequency spectrum through FFT. By developing an optimized floating point multiplication routine, it was possible to reduce the required cycles for multiplication up to 54% on average. The novel multiplication method exploits the simplicity of initial twiddle factors and the predictability of the input data to generate the result in minimum clock cycles, either via bitwise operations or from a precomputed lookup table. The efficient multiplication routine was able to improve the FFT computation speed by 9.22% for regular ECG waveform processing. The energy used per floating point multiplication was also reduced by 37% on average, allowing for an increase in FFT runtime of 0.4 years on a regular cardiac pacemaker battery. Although this novel approach for FFT computation was presented for ECG data, the concept of profiling a signal and populating appropriate lookup tables can be applied to any dataset that exhibit high probability of repeated samples. Similar code level optimization not only helps to lower the energy requirement of a given task, but also reduces the demand for application specific hardware design.

REFERENCES

[1] T. M. Peters and J. C. Williams, The fourier transform in biomedical engineering. Springer Science & Business Media, (2012).

[2] P. de Carvalho, J. Henriques, R. Couceiro, M. Harris, M. Antunes, and J. Habetha, "Modelbased atrial fibrillation detection," in ECG Signal Processing, Classification and Interpretation (A. Gacek and W. Pedrycz, eds.), pp. 99-133, Springer London, (2012)

[3] F. Vaneghi, M. Oladazimi, F. Shiman, A. Kordi, M. Safari, and F. Ibrahim, "A comparative approach to ecg feature extraction methods," in Intelligent Systems, Modelling and Simulation (ISMS), 2012 Third International Conference on, pp. 252-256, February (2012).

[4] N. Abdul-Kadir, N. Safri, and M. Othman, "Effect of ecg episodes on parameters extraction for paroxysmal atrial fibrillation classification," in Biomedical Engineering and Sciences (IECBES), 2014 IEEE Conference on, pp. 874-877, December (2014).

[5] A. S. Al-Fahoum and A. A. Al-Fraihat, "Methods of eeg signal features extraction using linear analysis in frequency and time-frequency domains," ISRN neuroscience, vol. (2014).

[6] D. Fraser, "Algorithm 545: An optimized mass storage fft [c6]," ACM Trans. Math. Softw., vol. 5, pp. 500-517, December (1979).

[7] S. Kral, F. Franchetti, J. Lorenz, and C. Ueberhuber, "Simd vectorization of straight line fft code," in Euro-Par 2003 Parallel Processing (H. Kosch, L. Bszrmnyi, and H. Hellwagner, eds.), vol. 2790 of Lecture Notes in Computer Science, pp. 251-260, Springer Berlin Heidelberg, (2003).

[8] H. Kamer, M. Auer, and C. W. Ueberhuber, "Multiply-add optimized fft kernels," Mathematical Models and Methods in Applied Sciences, vol. 11, no. 01, pp. 105-117, (2001).

[9] G. Bergland, "A guided tour of the fast fourier transform," Spectrum, IEEE, vol. 6, no. 7, pp. 41-52, (1969).

[10] T. H. Cormen, Introduction to algorithms. MIT press, (2009).

[11] H. V. Sorensen, D. L. Jones, M. T. Heideman, and C. S. Burrus, "Real-valued fast fourier transform algorithms," Acoustics, Speech and Signal Processing, IEEE Transactions on, vol. 35, no. 6, pp. 849-863, (1987).

[12] H. V. Sorensen, M. T. Heideman, and C. S. Burrus, "On computing the split-radix fft," Acoustics, Speech and Signal Processing, IEEE Transactions on, vol. 34, no. 1, pp. 152-156, (1986).

[13] T. Pitknen, R. Mkinen, J. Heikkinen, T. Partanen, and J. Takala, "Low-power, high performance tta processor for 1024-point fast fourier transform," in Embedded Computer Systems: Architectures, Modeling, and Simulation (S. Vassiliadis, S. Wong, and T. Hmlinen, eds.), vol. 4017 of Lecture Notes in Computer Science, pp. 227-236, Springer Berlin Heidelberg, (2006).

[14] S. Haddad and W. Serdijn, "The evolution of pacemakers: An electronics perspective," in Ultra Low-Power Biomedical Signal Processing, Analog Circuits and Signal Processing, pp. 13-31, Springer Netherlands, (2009).

[15] B. Widrow, "Statistical analysis of amplitude-quantized sampled-data systems," Transactions of the American Institute of Electrical Engineers, Part II: Applications and Industry, vol. 79, pp. 555-568, (1961).

[16] C. H. Renumadhavi, S. M. Kumar, A. G. Ananth, and N. Srinivasan, "A new approach for evaluating snr of ecg signals and its implementation," in Proceedings of the 6th WSEAS International Conference on Simulation, Modelling and Optimization, SMO '06, (Stevens Point, Wis., USA), pp. 202-205, World Scientific and Engineering Academy and Society (WSEAS), (2006).

[17] J. D. Bronzino, Biomedical engineering handbook, vol. 2. CRC press, (1999).

[18] M. Jiang, B. Yang, R. Huang, T. Zhang, and Y. Wang, "Multiplierless fast Fourier transform architecture," Electronics Letters, vol. 43, pp. 191-192, (2007).

[19] M. Chandan, S. L. Pinjare, and C. M. Umapthy, "Optimised FFT design using Constant Coefficient Multiplier," vol. 2, no. 6, pp. 2-7, (2012).

[20] T. Nguyen, "On the Fixed-Point Accuracy Analysis of FFT Algorithms," IEEE Transactions on Signal Processing, vol. 56, pp. 4673-4682, (2008).

[21] "IEEE standard for floating-point arithmetic," IEEE Std 754-2008, pp. 1-70, August (2008).

[22] Embedded. Artists, "Lpc11u35 quickstart board user manual," Available at: http://www.embeddedartists.com/products/boards/, June (2012).

[23] S. R. Sridhara, "Ultra-low power microcontrollers for portable, wearable, and implantable medical electronics," in Proceedings of the 16th Asia and South Pacific Design Automation Conference, pp. 556-560, IEEE Press, (2011).

[24] D. Jeon, Y.-P. Chen, Y. Lee, Y. Kim, Z. Foo, G. Kruger, H. Oral, O. Berenfeld, Z. Zhang, D. Blaauw, et al., "24.3 an implantable 64 nw ecg-monitoring mixed-signal soc for arrhythmia diagnosis," in Solid-State Circuits Conference Digest of Technical Papers (ISSCC), 2014 IEEE International, pp. 416-417, IEEE, (2014).

[25] ARM, M0 Technical Reference Manual Rev. r0p0, (2010).

[26] A. L. Goldberger, L. A. N. Amaral, L. Glass, J. M. Hausdorff, P. C. Ivanov, R. G. Mark, J. E. Mietus, G. B. Moody, C.-K. Peng, and H. E. Stanley, "PhysioBank, PhysioToolkit, and PhysioNet: Components of a new research resource for complex physiologic signals," Circulation, vol. 101, no. 23, pp. e215-e220, (2000)

[27] Biotronik, Biotrnik Effecta Pacemaker Technical Manual. Berlin, Germany, h ed., (2010).

What is claimed:

1. An apparatus, comprising:
an analog-to-digital converter (ADC) configured to sample Electrocardiogram (ECG) readings and convert the samples to binary ECG data; and
a controller configured to receive the ECG data from the ADC and transform the received ECG data into a frequency domain through a Fast Fourier Transform (FFT), wherein the controller is configured to perform arithmetic operations required for the Fast Fourier Transform of the received data by performing steps comprising:
receiving a first operand of the received data for an intermediate multiplication operation of the Fast Fourier Transform (FFT);
receiving a second operand of the received data for the multiplication operation wherein the first and second operands are represented in floating-point format and the multiplication operation represents the product of the first operand and the second operand;
determining which of a predetermined set of values corresponds with the first operand; and
calculating a result of the multiplication operation based, at least in part, by accessing a lookup table loaded with precomputed multiplication results, wherein the precomputed multiplication results correspond to the predetermined set of values.

2. The apparatus of claim 1, wherein the step of determining which of the predetermined set of values comprises examining only a subset of bits representing the first operand.

3. The apparatus of claim 2, wherein the first operand is represented as an IEEE-754 single precision floating point format value, and wherein the step of examining only the subset of bits comprises examining a third byte of the bits.

4. The apparatus of claim 1, wherein the predetermined set comprises at least zero and one.

5. The apparatus of claim 4, wherein the step of calculating the result comprises:
returning a zero when the first operand comprises zero;
returning the second operand when the first operand comprises one;
returning a value from the lookup table when the first operand comprises at least one other value of the predetermined set of values; and
performing the multiplication operation in the controller when an entry from the lookup table does not match the first operand and the second operand.

6. The apparatus of claim 5, wherein the step of returning the value from the lookup table comprises calculating an index of the lookup table comprising the steps of:
extracting an exponent value of the second operand; and
using the extracted exponent value to shift a mantissa of the second operand by an appropriate amount to the right to find an integer value of the second operand.

7. The apparatus of claim 1, wherein the controller is a microcontroller, and wherein the apparatus is a low-power biomedical embedded solution.

8. The apparatus of claim 7, wherein the microcontroller is configured to receive a set of first operands from the ADC.

9. The apparatus of claim 8, wherein the ADC and microcontroller can be configured to carry out the signal processing at least in part, required in a cardiac pacemaker by computing the FFT of Electrocardiogram (ECG).

10. The apparatus of claim 9, wherein the microcontroller is further configured to generate a frequency spectrum of the ECG data.

11. A method, comprising:
sampling, with an analog-to-digital converter (ADC), Electrocardiogram (ECG) readings;
converting the samples to binary ECG data;
receiving, by a controller, the ECG data and transforming the received data into a frequency domain through a Fast Fourier Transform (FFT), wherein the arithmetic operations of transforming comprises steps comprising:
receiving a first operand of the received data for an intermediate multiplication operation for the Fast Fourier Transform (FFT);
receiving a second operand of the received data for the multiplication operation, wherein the first and second operands are represented in floating-point format and the multiplication operation represents the product of the first operand and the second operand;
determining which of a predetermined set of values corresponds with the first operand; and
calculating a result of the multiplication operation by accessing a lookup table loaded with precomputed multiplication results, wherein the precomputed multiplication results correspond to the predetermined set of values.

12. The method of claim 11, wherein the step of determining which of the predetermined set of values comprises examining only a subset of bits representing the first operand.

13. The method of claim 11, wherein the predetermined set comprises at least zero and one.

14. The method of claim 13, wherein the step of calculating the result comprises:
returning a zero when the first operand comprises zero;
returning the second operand when the first operand comprises one;

returning a value from the lookup table when the first operand comprises at least one other value of the predetermined set of values; and performing the multiplication operation in the controller when an entry from the lookup table does not match the first operand and the second operand.

15. The method of claim 14, wherein the step of returning the value from the lookup table comprises calculating an index of the lookup table comprising the steps of:

extracting an exponent value of the second operand; and using the extracted exponent value to shift a mantissa of the second operand by an appropriate amount to the right to find an integer value of the second operand.

16. The method of claim 11, wherein the step of transforming the received data comprises generating a frequency spectrum of the ECG data.

17. A computer program product, comprising:

a non-transitory computer readable medium comprising code to perform the steps of:

sampling, with an analog-to-digital converter (ADC), Electrocardiogram (ECG) readings;

converting the samples to binary ECG data;

receiving, by a controller, the ECG data and transforming the received data into a frequency domain through a Fast Fourier Transform (FFT), wherein the code to perform the transforming step comprises code to perform floating point multiplication steps comprising:

receiving, by a controller, the ECG data and transforming the received data into a frequency domain through a Fast Fourier Transform (FFT), wherein the arithmetic operations of transforming comprises steps comprising:

receiving a first operand of the received data for an intermediate multiplication operation for the Fast Fourier Transform (FFT);

receiving a second operand of the received data for the multiplication operation, wherein the first and second operands are represented in floating-point format and the multiplication operation represents the product of the first operand and the second operand;

determining which of a predetermined set of values corresponds with the first operand; and calculating a result of the multiplication operation by accessing a lookup table loaded with precomputed multiplication results, wherein the precomputed multiplication results correspond to the predetermined set of values.

18. The computer program product of claim 17, wherein the predetermined set comprises at least zero and one.

19. The computer program product of claim 17, wherein the step of calculating the result comprises:

returning a zero when the first operand comprises zero;

returning the second operand when the first operand comprises one;

returning a value from the lookup table when the first operand comprises at least one other value of the predetermined set of values; and performing the multiplication operation in the controller when an entry from the lookup table does not match the first operand and the second operand.

20. The computer program product of claim 19, wherein the step of returning the value from the lookup table comprises calculating an index of the lookup table comprising the steps of:

extracting an exponent value of the second operand; and using the extracted exponent value to shift a mantissa of the second operand by an appropriate amount to the right to find an integer value of the second operand.

* * * * *